(12) United States Patent
Auvray et al.

(10) Patent No.: US 6,640,033 B2
(45) Date of Patent: Oct. 28, 2003

(54) DUAL-LAYER FIRE RETARDANT STRUCTURE WITH AIR GAP

(75) Inventors: Thierry Auvray, Lyons Cedex (FR); Nicholas Nechitailo, Conover, NC (US)

(73) Assignee: Alcatel, Paris (FR)

(*) Notice: Subject to any disclaimer, the term of this patent is extended or adjusted under 35 U.S.C. 154(b) by 22 days.

(21) Appl. No.: 09/998,653

(22) Filed: Dec. 3, 2001

(65) Prior Publication Data
US 2003/0103742 A1 Jun. 5, 2003

(51) Int. Cl.[7] .................................................. G02B 6/44
(52) U.S. Cl. ........................................ 385/109; 385/112
(58) Field of Search ................................. 385/109, 112, 385/113

(56) References Cited

U.S. PATENT DOCUMENTS

| | | |
|---|---|---|
| 4,605,818 A | 8/1986 | Arroyo et al. |
| 4,781,433 A | 11/1988 | Arroyo et al. |
| 4,804,245 A | 2/1989 | Katayose et al. |
| 4,818,060 A | 4/1989 | Arroyo |
| 5,377,290 A * | 12/1994 | Ohta et al. .................. 385/100 |
| 5,666,452 A | 9/1997 | Deitz, Sr. et al. |
| 5,956,445 A | 9/1999 | Deitz, Sr. et al. |
| 6,003,565 A | 12/1999 | Whittier, II et al. |
| 6,049,647 A | 4/2000 | Register et al. |
| 6,160,940 A | 12/2000 | Summers et al. |
| 6,167,180 A | 12/2000 | Keller |
| 6,178,278 B1 | 1/2001 | Keller et al. |
| 6,249,629 B1 * | 6/2001 | Bringuier .................... 385/113 |

* cited by examiner

Primary Examiner—Michael C. Zarroli
(74) Attorney, Agent, or Firm—Sughrue Mion, PLLC

(57) ABSTRACT

The cable according the present invention has at least two layers of thermally conductive tape wrapped around a center cable core, where a layer of flame-retardant yarn is placed between the layers of tape such that air gaps are created. Further, in the present invention, a powder having a low thermal conductivity is placed in the air gaps to further retard flame penetration and smoke generation. The thermally conductive tape of the present invention can be made from either Mica tape, or metallic foil and is wound helically along the length of the cable.

38 Claims, 1 Drawing Sheet

DUAL-LAYER FIRE RETARDANT STRUCTURE WITH AIR GAP

BACKGROUND OF THE INVENTION

1. Field of the Invention

The present invention generally relates to the field of optical fibers, in particular the present invention is directed to a fiber optic cable having improved flame and smoke retardant characteristics.

2. Discussion of Related Art

Optical fibers are very small diameter glass strands which are capable of transmitting an optical signal over great distances, at high speeds, and with relatively low signal loss as compared to standard wire or cable networks. The use of optical fibers in today's technology has developed into many widespread areas, such as: medicine, aviation, communications, etc. Because of this development, there is a growing need to produce optical fibers of better quality at faster rates and lower costs, while providing adequate safety protections.

Many of the areas of use for optical fibers, such as communications, require the optical fibers be protected from various destructive elements, such as adverse weather, moisture, impact damage, and fire. When fiber optic cables are used in commercial and residential buildings they must meet certain flame, fire and smoke retardation requirements. For example, one of the most stringent tests requires placing a fiber optic cable horizontally over an open flame for 30 to 40 minutes, and to pass the test the cable can not generate an excessive amount of dense smoke.

Many components in fiber optic cables, such as buffer tubes and central strength members, generate excessive smoke when heated to high temperatures. In existing cables when a heat source is applied the heat propagates radially towards the center of the cable, where all of the smoke generating components are located. This is mainly due to the materials used, which do not allow heat to propagate along the length of cable easily.

There have been advances in cable fire and smoke retardation for fiber optic cables, however, many of the existing advances and cable configurations still fail the above mentioned test. Therefore, there is a need for a cable structure which does not generate dense smoke within the 30 to 40 minute window.

SUMMARY OF THE INVENTION

The present invention is directed to a fiber optic cable structure having improved flame and smoke retardant properties. This is accomplished by adding two layers of Mica tape, or similar material, around the cable core (which includes mainly the buffer tubes and, central strength member), where between the two layers of Mica tape is a layer of flame-retardant yarn which forms air gaps between the layers of tape. The first layer of Mica (outermost) acts as a fire (hot plasma) barrier, while the air gaps resist heat propagation from the outer Mica layer to the inner Mica layer and the cable core components. The two tape layers also allow the heat from an applied flame to propagate along the length of the cable instead of having the heat radiate inward from the point where the flame is applied. By allowing the heat to propagate longitudinally, the heat is dissipated over a larger area and, as such, passes less heat to any one point in the center core of the cable. This greatly lengthens the time needed to cause the center core components to start generating significant amounts of dense smoke. Further, even when smoke is generated, the tape layers act as a smoke barrier, preventing the smoke from escaping from the center core.

In an alternate embodiment, a powder having low-thermal conductivity is placed within the air gaps, between the two tape layers, to aid in preventing heat propagation from the outer layer to the internal components. In another embodiment, a limestone or similar powder with low thermal conductivity is placed in the cable to be decomposed under high heat and to generate carbon dioxide as a means to absorb heat and aid in extinguishing or inhibiting fire. Further, as an alternative to the Mica tape, aluminum (or any other thermally conductive metal) foil can be used to rapidly conduct the heat from the flame longitudinally along the cable, which reduces the propagation of the heat in the radial direction (i.e. towards the center of the cable).

In the present invention the tape material and thickness and the air gap size are optimized to reach the best performance in smoke and fire retardation.

BRIEF DESCRIPTION OF THE DRAWINGS

The advantages, nature and various additional features of the invention will appear more fully upon consideration of the illustrative embodiment of the invention which is schematically set forth in the drawing, in which.

DETAILED DESCRIPTION OF THE INVENTION

Figure 1:
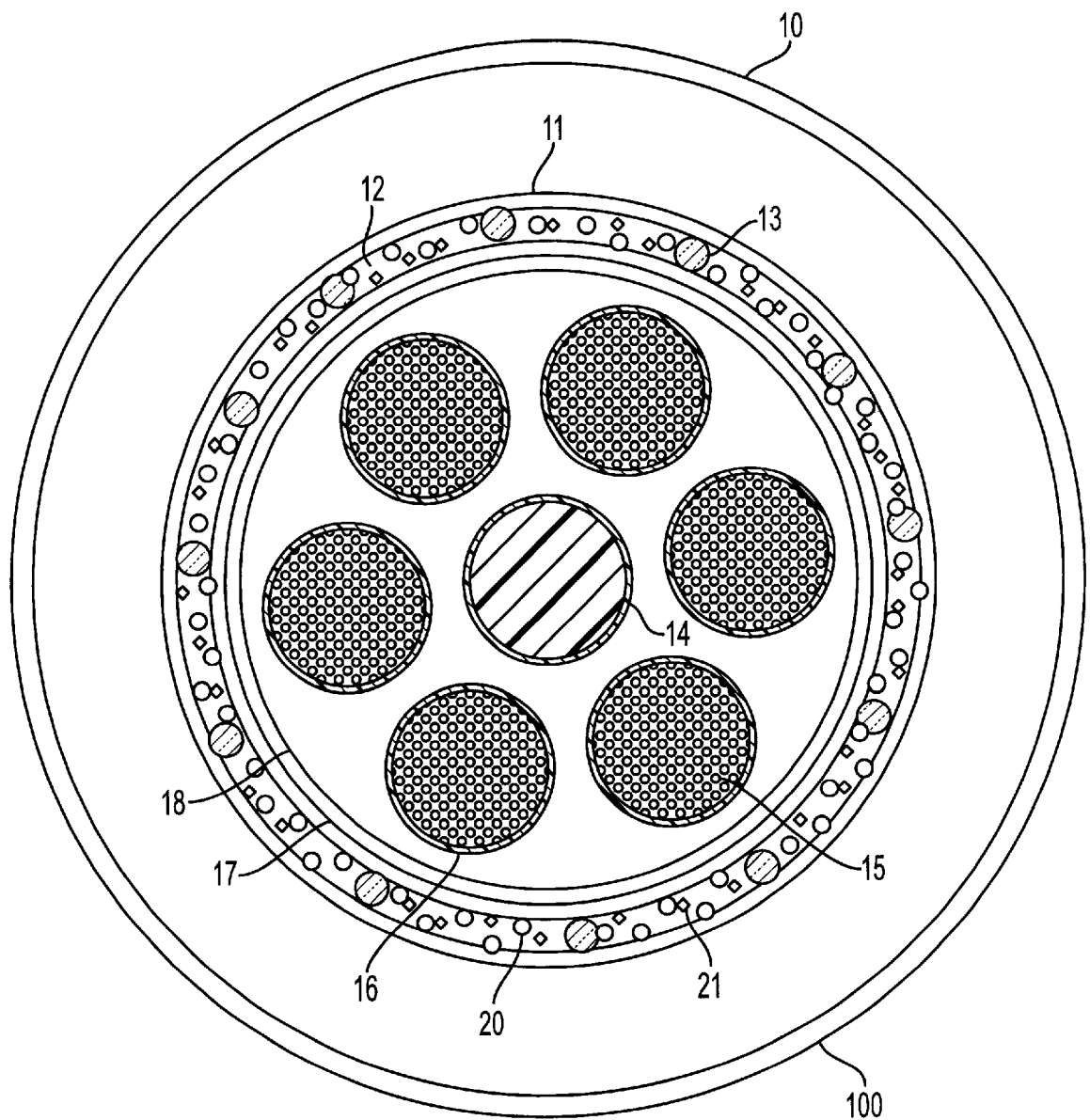
FIG. 1 is a cross-sectional view of a fiber optic cable according to the present invention.

The present invention will be explained in further detail by making reference to the accompanying drawings, which do not limit the scope of the invention in any way.

Turning now to FIG. 1, a fiber optic cable 100 according to the present invention is shown. The cable 100 is made up of a series of layers of material as well as a cable core. The cable core comprises a central strength member 14, a plurality of buffer tubes 16, each having a plurality of fibers 15, and a binder 18. It should be noted that although the fibers 15 are shown loosely in this figure, the present invention may be used with any configuration of fibers, such as fiber ribbons, etc. The central strength member 14, the binder 18 and the buffer tubes 16 can be made from any commonly known or used material for these applications, however, in the preferred embodiment these components should be made from fire and smoke retardant materials to aid in preventing the generation of dense smoke. Examples include, glass yarns for the binders 18 and glass-reinforced plastic material for the central strength member 14. Further, upjacket of the central strength member 14 serves as a spacer to accommodate the diameter and number of the buffer tubes 16 within the cable 100. The buffer tubes 16 are typically made of thermoplastic materials. The cable 100 also has an outer jacket 10, which is made from any commonly known or used material for this application, and should also preferably have fire and smoke retardation characteristics.

In the present invention, the binder 18 of the center core is covered by a first layer of fire retardant tape 17. In a preferred embodiment, this tape 17 is made of Mica, for its thermally retardant characteristics. In another embodiment, this tape 17 can be made from a metallic foil such as aluminum foil. The use of a metallic foil allows the heat from the flame source to propagate along the length of the tape 17, instead of radiating towards the center core and the critical components therein (where most of the smoke is generated due to the materials used). The tape 17 is wrapped around the cable core for providing a sealed smoke barrier to keep any smoke that is generated inside the core. The tape layer 17 is applied helically, counter-helically or longitudinally, however, in the preferred embodiment the tape 17 is tightly wrapped helically to provide efficient smoke performance of the cables. An example of the tape that is used is CogeMica 120 P34A®, which is 50 mm wide, and is wrapped with approximately a 7 mm overlap for helical and longitudinal configurations. Another example is FR22/103 Megotape®.

In the preferred embodiment, the tape 17 thickness is between 0.05 and 0.40 mm to optimize protection while taking into account cable space requirements. (It is noted that the present invention is not limited to using tape with the thickness set forth above.) An example is 3M Dot Paper® which exhibits good flame prevention capabilities. It should be noted however that when using tape with a relatively low thickness and low mechanical strength (such as the 3M Dot Paper) it may be necessary to reinforce the paper to prevent breakage during cable manufacture. A backing strength mesh (not shown) may be applied for this purpose.

A layer of flame retardant yarn 13 is wound over the tape layer 17. The yarn has flame retardant characteristics to aid in the prevention of smoke generation, and preferably has high flame retardation and heat absorption characteristics. Additionally, it is preferred that the yarn 13 be made of a material which generates carbon dioxide under heat exposure. The generation of carbon dioxide aids in flame and fire retardation, while also providing additional atmosphere in and around the cable to absorb the heat generated during flame exposure. An example of the yarn that can be used is a glass yarn, for example Roblon 1200 tex®. The yarn 13 is preferably (but not limited to) about 0.5 to 1.5 mm in diameter, and is glass-reinforced. Again, as with the tape 17, the size of the yarn used should be optimized to provide the maximum gap, but taking into account the cable size and space considerations. The yarn 13 is preferably wrapped helically around the tape 17 with a small pitch to form air gaps 12 between the successive tape layers 17 and 11. The air gaps 12 aid in preventing the propagation of heat radially towards the center of the cable 100, and aid in having the heat from the flame propagate along the length of the cable 100. The larger the air gaps 12 the better the smoke retardation characteristics. In the preferred embodiment the air gaps 12 should be at least 1 mm high in the radial direction. In the preferred embodiment, the yarn 13 and air gaps 12 are spaced and configured such that the radial size of the air gaps are substantially maintained when the outer jacket 10 is placed on the cable 100. These components should be such that the compressive forces in the cable to not overly "compress" the air gaps 12 to reduce there radial height to compromise their effectiveness. To aid in this regard, it is contemplated that spherical or pellet-shaped (or any other appropriate shaped) inorganic particles 20 can be placed in the air gap 12 to prevent the gaps 12 from compressing. Examples of components that can be used are, ZYLON® pulp, chopped fiber and felt.

The tape layer 11 could be the same material as that used for the inner layer 17, or can be different. The exact configuration is optimized to meet the manufacture and design specifications needed. For example, the outer layer 11 may be made from a metallic foil, while the inner layer 17 can be made from Mica tape, or vice versa, depending on the design, manufacture and cost parameters. In the preferred embodiment, the outer layer 11 is wound at an angle approximately 90 degrees, or less, to the winding angle of the inner layer 17. This configuration provides a seal for any smoke generated inside the cable core during flame exposure and thus improves the smoke retardation characteristics of the present invention. In another preferred embodiment the tape layers 11, 17 are laid longitudinally with respect to the cable, such that there is only one long seam along the length of the cable for each tape layer. This configuration reduces material use while providing only one seam. In this embodiment it is preferred that the seam of one layer (for example the outer layer 11) has its seam at approximately 180 degrees from the seam of the other layer (for example the inner layer 17) for smoke retention.

In a second embodiment of the present invention, the air gaps 12 are filled with a low-thermally conductive powder 21. The use of the powder 21 aids in preventing heat from radiating radially to the center of the cable 100, and thus increases the time to which the center components of the cable 100 start emitting significant smoke. Examples of the types of powders that can be used are ceramic type powders, limestone powders or calcium carbonate powders, etc. In the preferred embodiment either a limestone or calcium carbonate powder is used. These powders absorb a large amount of heat and generate carbon dioxide when exposed to heat. The generation of carbon dioxide is beneficial in the present invention for a number of reasons. First, the generation of carbon dioxide creates additional gases in the gaps 12. These additional gases causes the air gaps to "expand" thus creating a larger radial distance between the tape 17 and the critical components of the cable. These larger gaps 12 aid in preventing or reducing heat propagation. Second, the presence of a carbon dioxide envelope around the cable's critical components aids in removing oxygen, and as such aids in acting as a fire or flame retardant. Finally, an additional advantage of the above materials is their water absorbing and blocking characteristics which aid in protecting the cable under advisers and/or moist conditions. It is noted that the powder 21 of the present invention can also be used in conjunction with the particles 20, and further that the particles can be made from the same or similar material as the powder or can be impregnated with the powder 21 to optimize the smoke and flame retardation characteristics of the cable 100. Additionally, the yarn 13 can also be made of, comprise or be impregnated with the same or similar material used for the powder 21 to aid in the smoke/fire retardation characteristics of the cable 100.

Further, in the preferred embodiment, the air gaps 12 should have a powder 21 saturation level of approximately 50%. It is noted that the present invention is not limited to this saturation level, and it is contemplated that in some applications the saturation level can be as high as approximately 100%, and as low as 0%. Further, the powder 21 can be used in a fine powder form or in a granular form. Additionally, it is contemplated that the powder 21 can be encapsulated within the existing thermoplastic materials used in the buffer tubes 16, outer jackets 10, central strength member 14, etc. This encapsulation can be done in accordance with any commonly known or used methods but should not be such that the integrity of the thermoplastic is overly compromised. Further, the encapsulation discussed above can be done in conjunction with the use of the powder 21 within the gaps 12 to provide additional protections.

Additionally, it is contemplated that the powder 21 used in the gaps 12 can be pre-saturated with water, or other heat absorbing material. The addition of a small amount of water or other material will aid in the heat absorption of the powder 21.

Further, although the above discussion is made in the context of fiber optic cables the present invention is not limited to use in fiber optic cables and may be used in other cable applications. Additionally, the present invention may also be used with a grouping of fibers within a single buffer tube where the tape and yarn layers are placed between the fibers and the buffer tube, and is not limited to use in a cable with the configuration shown in FIG. 1. Moreover, although the present invention, in FIG. 1, is shown with only two layers 11 and 17, it is understood that as cable space permits additional layers can be added having yarn 13 placed therebetween. For example, a second yarn layer and third tape layer can be added between the layer 11 and the outer jacket 10.

It is of course understood that departures can be made from the preferred embodiments of the invention by those of ordinary skill in the art without departing from the spirit and scope of the invention that is limited only by the following claims.

We claim:

1. A fiber optic cable, comprising:
   a center core;
   at least a first and second layer of tape, wherein said first layer is wrapped around said center core; and
   at least one yarn wrapped around said first layer and positioned between said first layer and said second layer so as to create air gaps between said first and second layers of said tape,
   wherein said air gaps contain a powder having low thermal conductivity.

2. The fiber optic cable claimed in claim 1, wherein at least one of said at least first and second layers are a thermally conductive tape.

3. The fiber optic cable claimed in claim 1, wherein said at least one yarn is a flame-retardant yarn.

4. The fiber optic cable claimed in claim 1, wherein at least one of said at least first and second layers are a Mica tape.

5. The fiber optic cable claimed in claim 1, wherein at least one of said at least first and second layers are a metallic foil.

6. The fiber optic cable claimed in claim 1, wherein both at least first and second layers are wound in a helical pattern longitudinally along said center core.

7. The fiber optic cable claimed in claim 6, wherein said layers are helically wound such that they are approximately 90 degrees to each other.

8. The fiber optic cable claimed in claim 1, wherein the tape of at least one of said layers runs longitudinally along said cable.

9. The fiber optic cable claimed in claim 8, wherein said at least one longitudinally running tape has an overlapping seam.

10. The fiber optic cable claimed in claim 1, wherein the tape of each of said layers runs longitudinally along said cable, and wherein each of said tapes has an overlapping seam such that the seam of one of said layers is positioned approximately 180 degrees from the seam of the other of said layers.

11. The fiber optic cable claimed in claim 1, wherein said air gaps have a radial height of approximately 1 mm.

12. The fiber optic cable claimed in claim 1, wherein said air gaps have a radial height of at least 1 mm.

13. The fiber optic cable claimed in claim 1, wherein said powder comprises at least one of limestone and calcium carbonate.

14. The fiber optic cable claimed in claim 1, wherein said powder occupies approximately 50% of said air gaps.

15. The fiber optic cable claimed in claim 1, wherein said tape has a thickness in the range of 0.05 to 0.40 mm.

16. The fiber optic cable claimed in claim 1, wherein said yarn has a diameter in the range of 0.5 to 1.5 mm.

17. The fiber optic cable claimed in claim 1, wherein said yarn is glass-reinforced.

18. The fiber optic cable claimed in claim 1, wherein said air gaps contain a powder having a low thermal conductivity and a plurality of inorganic particles.

19. The fiber optic cable claimed in claim 18, wherein said inorganic particles are made from the same material as said powder.

20. The fiber optic cable claimed in claim 1, wherein said yarn emits carbon dioxide when exposed to heat.

21. The fiber optic cable claimed in claim 1, wherein said powder emits carbon dioxide when exposed to heat.

22. The fiber optic cable claimed in claim 18, wherein at least one of said powder and said inorganic particles emits carbon dioxide when exposed to heat.

23. The fiber optic cable claimed in claim 1, further comprising at least one of a buffer tube, binder and outer jacket, wherein said at least one of said buffer tube, binder and outer jacket at least partially comprise a powder having low thermal conductivity.

24. The fiber optic cable claimed in claim 23, wherein said powder comprises at least one of limestone or calcium carbonate.

25. The fiber optic cable claimed in claim 23, wherein said powder emits carbon dioxide when exposed to heat.

26. The fiber optic cable claimed in claim 1 wherein said powder is in a granular form.

27. The fiber optic cable claimed in claim 1, wherein said air gaps contain a plurality of inorganic particles.

28. A fiber optic cable, comprising:
   a center core;
   at least a first and second layer of tape, wherein said first layer is wrapped around said center core; and
   at least one yarn wrapped around said first layer and positioned between said first layer and said second layer so as to create air gaps between said first and second layers of said tape,
   wherein said tape has a thickness in the range of 0.05 to 0.4 mm.

29. The fiber optic cable claimed in claim 28, wherein at least one of said at least first and second layers are a thermally conductive tape.

30. The fiber optic cable claimed in claim 28, wherein both at least first and second layers are wound in a helical pattern longitudinally along said center core.

31. The fiber optic cable claimed in claim 28, wherein the tape of at least one of said layers runs longitudinally along said cable.

32. The fiber optic cable claimed in claim 28, wherein said air gaps have a radial height of at least 1 mm.

33. The fiber optic cable claimed in claim 28, wherein said air gaps contain a powder.

34. The fiber optic cable claimed in claim 33, wherein said powder occupies approximately 50% of said air gaps.

35. The fiber optic cable claimed in claim 28, wherein said air gaps contain a powder having a low thermal conductivity and a plurality of inorganic particles.

36. The fiber optic cable claimed in claim 28, wherein said yarn emits carbon dioxide when exposed to heat.

37. The fiber optic cable claimed in claim 33, wherein said powder emits carbon dioxide when exposed to heat.

38. The fiber optic cable claimed in claim 28, further comprising at least one of a buffer tube, binder and outer jacket, wherein said at least one of said buffer tube, binder and outer jacket at least partially comprise a powder having low thermal conductivity.

* * * * *